United States Patent Office  3,043,771
Patented July 10, 1962

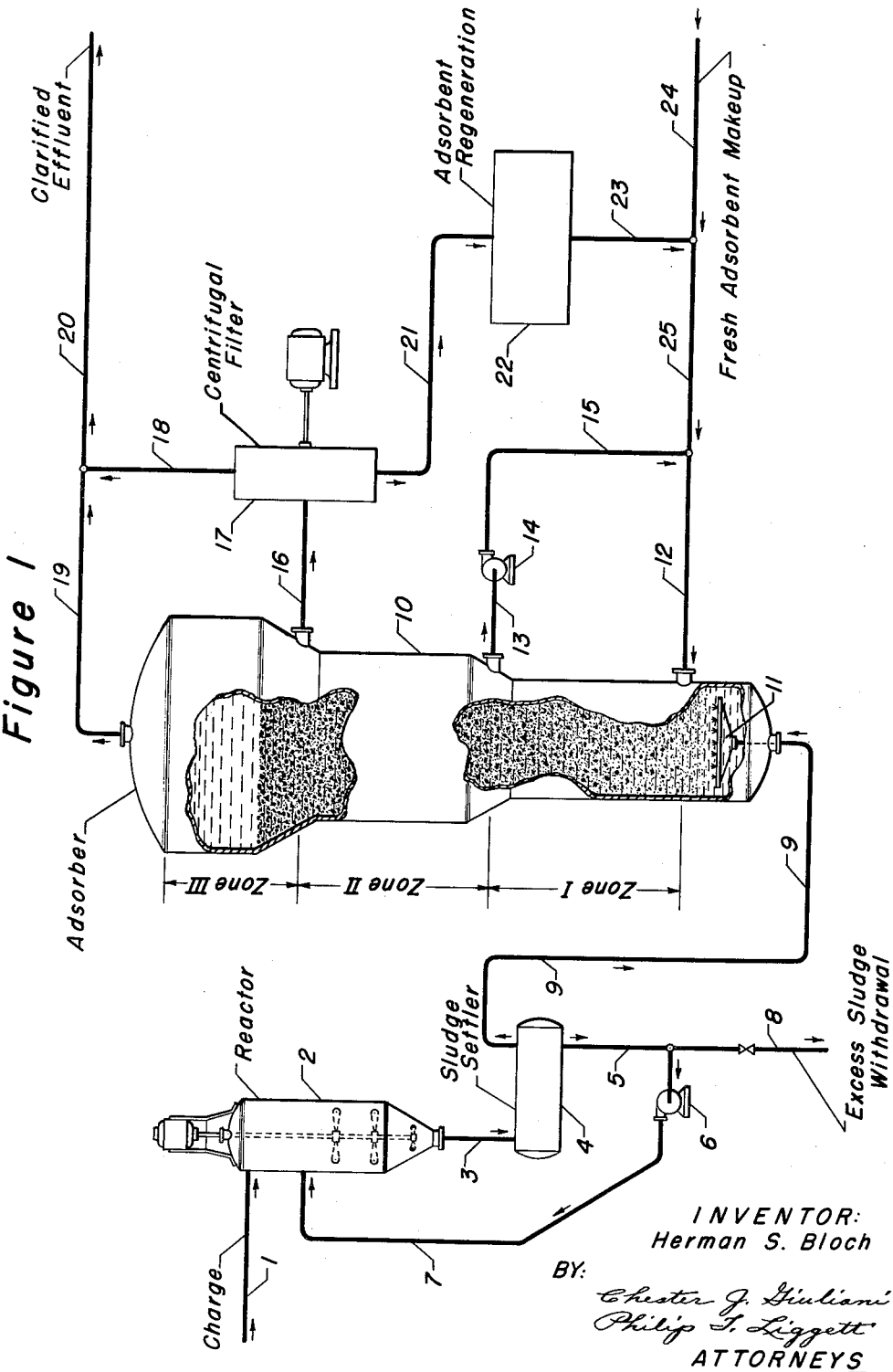

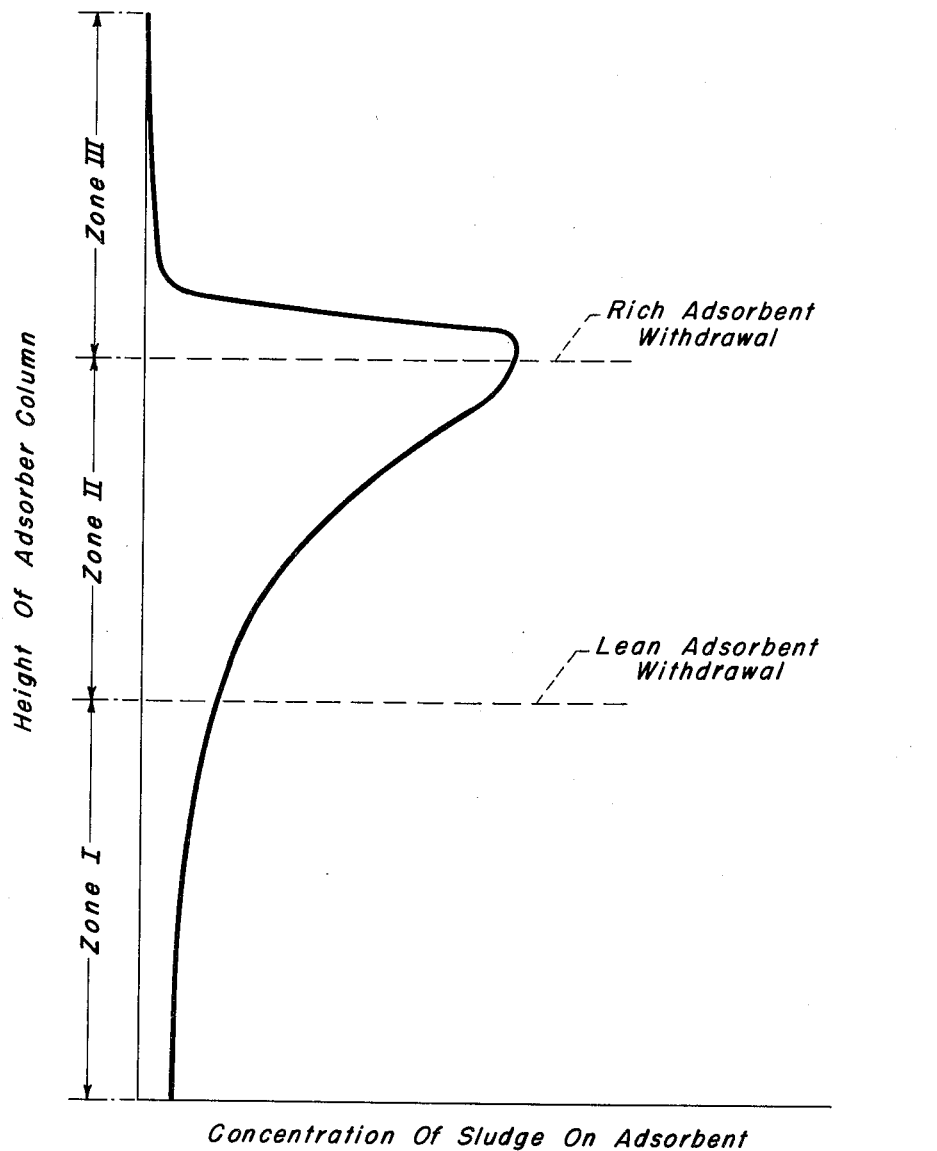

3,043,771
PROCESS FOR THE REMOVAL OF SLUDGE
FROM A LIQUID STREAM
Herman S. Bloch, Skokie, Ill., assignor to Universal Oil Products Company, Des Plaines, Ill., a corporation of Delaware
Filed Sept. 10, 1959, Ser. No. 839,169
10 Claims. (Cl. 208—299)

This invention relates to an improved process for effecting the continuous removal of sludge from a liquid stream and particularly concerns a method of contacting liquid hydrocarbon effluent from a catalytic conversion zone with a fluid bed of particulate adsorbent whereby sludge and/or catalyst, which are carried by the liquid either in solution or entrained therewith, are deposited onto the adsorbent particles and thereby removed from the liquid stream. It is a particular feature of the present invention to provide continuous or semicontinuous regeneration of the spent adsorbent particles by selectively withdrawing the spent particles from the contacting zone and recycling them through a regeneration zone.

Many reactions involving hydrocarbons including isomerization of paraffins, alkylation of isoparaffins and aromatics, acetylation of aromatics, polymerization of olefins, and the like, are advantageously carried out in the presence of an acidic catalyst, particularly HF, $H_2SO_4$, and metallic halides of the Friedel-Crafts class such as the chlorides and bromides of aluminum, zinc, zirconium and iron, mixtures of two or more of such halides, or any of such metallic halides in admixture with HCl or HBr. A typical isoparaffin-olefin alkylation process of commercial importance employs substantially anhydrous HF as the catalyst; another employs $H_2SO_4$. Of the Friedel-Crafts catalysts for the conversion of hydrocarbons, aluminum chloride possesses superior activity, is relatively inexpensive, and is therefore one of the most widely utilized. The aluminum chloride may be suspended, in finely divided form, in the reaction mixture, or disposed in the form of a fixed bed comprising either granules of $AlCl_3$ or $AlCl_3$ deposited on a refractory support, or carried in the form of a fluid, $AlCl_3$-enriched sludge. Such hydrocarbon conversion processes suffer an inherent and often troublesome drawback—namely, the unavoidable formation, within the reaction zone or in the conduits downstream therefrom, of a corrosive, viscous sludge, also known as "catalyst complex." The sludge has not been chemically characterized but it is known to be a liquid complex comprising spent catalyst in combination with high boiling polymers formed as a by-product of secondary reactions. The yield of sludge may be somewhat reduced through careful control of reactant: catalyst ratio, space time, and reaction temperature, but even at optimum conditions it is still produced in substantial amounts. The major processing difficulty caused thereby is the transport of sludge, either suspended in the reactor effluent or in solution therewith, throughout the reactor system. The sludge is usually deposited throughout various processing facilities including reaction vessels and equipment downstream of the reaction zone, eventually resulting in the fouling of reactors, piping, heat exchangers, pumps, fractionators, etc. Since acidic catalyst is entrained or combined in the liquid complex, the sludge is often corrosive to process equipment unless suitable expensive alloys are used. Where aluminum chloride is used as a catalyst, the problem is accentuated in that the aluminum chloride, which has a small but definite solubility in hydrocarbons, is carried throughout the process unit by the hydrocarbon stream deposited on vessel walls, and there converted to sludge. Furthermore, substantial quantities of $AlCl_3$ are thereby lost from the reaction zone, thus accelerating the depletion of catalyst therein and necessitating frequent replenishment of the aluminum chloride.

One present technique in the operation of commercial isomerization and alkylation units which employ a sludge-forming catalyst is to pass the raw conversion products directly from the reaction zone through an adsorber vessel containing a fixed mass of suitable adsorbent material, usually in the form of a bed of granules or small particles, which removes entrained and dissolved sludge therefrom. Generally, one or more blocked-in adsorption vessels are connected in parallel and retained as spares for use when the adsorbent in the on-stream vessel becomes saturated with sludge and/or $AlCl_3$. The spent adsorbent is regenerated in situ in cyclic fashion, or is dumped and replaced with fresh adsorbent. Such operation may be characterized as batch-wise or, at best, semi-continuous, and heretofore it has not been possible to devise a practicable, truly continuous sludge-removal process utilizing a solid adsorbent.

It is therefore a principal object of the present invention to provide a method for continuously removing sludge from a sludge-containing liquid stream utilizing a solid adsorbent.

A particular object of this invention is to admix a sludge-containing liquid with a solid, particulate adsorbent and thereafter pass the resulting suspension to a particle separation zone wherefrom a stream of sludge-rich adsorbent particles is selectively withdrawn for regeneration of the adsorbent.

Another object of this invention is to remove sludge from the hydrocarbon effluent leaving an acid-catalyzed hydrocarbon conversion zone.

A further object of the instant invention is to remove entrained and dissolved aluminum chloride from the hydrocarbon effluent leaving an $AlCl_3$-catalyzed hydrocarbon conversion zone.

These and other objects and advantages of this invention will be self-evident from the accompanying disclosure and drawing.

The present invention provides a continuous adsorption process which employs various well-known solid adsorbents whose adsorbing capabilities are recognized as excellent, which process, however, embodies a unique flow arrangement designed to take advantage of a peculiar and hitherto unknown property of sludged adsorbent particles, that is, adsorbent particles having a substantial amount of sludge deposited thereon. Surprisingly, it has been discovered that there is a difference in the settling rate of finely divided solid adsorbents suspended in a liquid between those which have adsorbed sludge and those that have not; as a general rule, the greater the sludge content of the adsorbent particles, the slower the settling rate thereof. It has further been found that various granular solid sludge-rich adsorbents maintain an apparently dry, free-flowing state with amounts of adsorbed fluid sludge thereon as high as 20% by weight. This behavoir enables the removal of fluid sludge from a process unit, in effect, as a dry, free-flowing, finely divided solid, thereby eliminating corrosion and deposition of sludge through the reactor system. More importantly, a sludge-removal operation, as well as adsorbent regeneration, may readily be effected on a continuous basis by first mixing adsorbent particles with a sludge-containing liquid in a suitable adsorption zone and thereafter passing the resultant slurry or particle suspension through a particle separation zone wherein the liquid velocity is adjusted to produce a zone of sludge-rich or spent particles having the desired concentration of sludge adsorbed thereon, such separation being made possible by the aforesaid difference in settling rates. The sludge-rich particles are continuously withdrawn from the separation zone, regenerated, and returned to the contacting zone. Preferably, sludge-lean particles are returned to the separation zone, either by internal or external recycle, for repeated contact with additional sludge-containing liquid. The adsorbent materials contemplated for use in the present invention are preferably particulate adsorbents, containing siliceous or aluminiferous compounds, or both, as will be hereinafter described more fully.

In one embodiment, the present invention provides a continuous process for the removal of sludge from a sludge-containing liquid which comprises mixing solid granular adsorbent with said liquid to form a suspension and adsorbing said sludge onto at least a portion of said adsorbent to form sludge-rich particles and sludge-lean particles, the sludge-rich particles having a settling rate less than the settling rate of said sludge-lean particles, flowing said suspension upwardly through a particle separation zone at a superficial liquid velocity less than the settling rate of said sludge-lean particles but greater than the settling rate of said sludge-rich particles thereby accumulating a preponderance of sludge-lean particles in the lower portion of said particle separation zone and a preponderance of sludge-rich particles in the upper portion thereof, withdrawing the resultant sludge-rich suspension from said upper portion and thereafter separating clarified liquid from said sludge-rich suspension.

A particular embodiment of the instant invention provides a continuous process for the removal of sludge from a sludge-containing liquid which comprises introducing said liquid together with solid adsorbent particles into the lower portion of a co-current adsorption zone thereby forming a suspension therein, flowing said suspension upwardly through said adsorption zone at a superficial liquid velocity in excess of the settling rate of said particles whereby to impart a net upward velocity to said particles, therein adsorbing said sludge onto a least a portion of said particles to form sludge-rich particles and sludge-lean particles, the sludge-rich particles having a settling rate less than the settling rate of said sludge-lean particles, thereafter passing said suspension into and upwardly through a particle separation zone at a superficial liquid velocity less than the settling rate of said sludge-lean particles but greater than the settling rate of said sludge-rich particles thereby creating in said particle separation zone an upper sludge-rich phase and a lower sludge-lean phase, withdrawing a slurry of sludge-lean particles from said sludge-lean phase and returning said slurry to said adsorption zone, flowing said sludge-rich phase into and upwardly through a clarification zone at a superficial liquid velocity less than the settling rate of said sludge-rich particles, withdrawing a slurry of sludge-rich particles from the lower portion of said clarification zone and withdrawing clarified liquid from the upper portion thereof.

A specific embodiment of this invention concerns an improvement in the method of removing sludge from a sludge-containing liquid hydrocarbon by contacting said hydrocarbon with a solid adsorbent, said hydrocarbon comprising conversion products previously formed in the presence of an acidic catalyst at conversion conditions, which improvement comprises mixing solid granular adsorbent with said hydrocarbon in an adsorption zone to form a suspension and therein adsorbing said sludge onto at least a portion of said adsorbent to form sludge-rich particles and sludge-lean particles, the sludge-rich particles having a settling rate less than the settling rate of said sludge-lean particles, flowing said suspension upwardly through a particle separation zone at a superficial liquid velocity less than the settling rate of said sludge-lean particles but greater than the settling rate of said sludge-rich particles thereby accumulating a preponderance of sludge-lean particles in the lower portion of said particle separation zone and a preponderance of sludge-rich particles in the upper portion thereof, withdrawing a slurry of sludge-lean particles from said lower portion and recirculating said slurry to said adsorption zone, withdrawing the resultant sludge-rich suspension from said upper portion and thereafter separating clarified hydrocarbon from said sludge-rich suspension.

In essence, the present process comprises three serially-connected zones: an absorption zone, a particle separation zone, and a clarification zone, in that order. The zones may be disposed in physically separate vessels or in a unitary vertical vessel, one zone therein being in open communication with the next. The sludge-containing liquid is introduced, together with adsorbent particles, into the adsorption zone which may be a stirred mixing vessel, a perforated plate contacting column, a vertically elongated vessel employing co-current or countercurrent flow between liquid and adsorbent, and the like. Substantially all of the entrained and dissolved sludge and catalyst is removed from the liquid stream in the adsorption zone; however, because excess adsorbent is preferably employed to insure substantially complete adsorption of the undesirable contaminants, and because of the random nature of the contacting mechanism, some particles will pick up more sludge than others. Those particles which adsorb the optimal maximum amount of sludge, which may vary from 2% to 20% or more by weight of the adsorbent depending upon the specific nature of the contactants, are herein designated as "sludge-rich" particles; the balance of the particles, carrying lesser amounts of sludge, are defined as "sludge-lean" particles. The terms "sludge-rich" and "sludge-lean" are thus seen to be purely relative, and the precise concentration of sludge encompassed thereby will vary with the particular application and, in most cases, may be varied over a wide latitude simply by regulating liquid-adsorbent ratio in the adsorption zone, the degree of separation in the particle separation zone, and the recycle rate of sludge-lean particles as hereinafter explained. The effluent leaving the adsorption zone is a liquid suspension containing sludge-rich and sludge-lean adsorbent particles. The suspension is passed to the particle separation zone and caused to flow upwardly therethrough at a superficial liquid velocity adjusted to accomplish the desired degree of particle separation while at the same time removing the sludge-rich particles from the particle separation zone as fast as they are introduced thereto. The term "superficial liquid velocity" is used herein in the sense customarily employed by those skilled in the chemical process arts: namely, it is the linear velocity of the liquid which would exist in the absence of entrained particles. Within the particle separation zone the upward superficial liquid velocity is adjusted so that it is greater than the settling rate of sludge-rich particles but less than the settling rate of sludge-lean particles. The overall particle mass is thus maintained in a fluidized state, the sludge-rich particles being carried to the upper portion of the particle separation zone to form a sludge-rich phase, and the sludge-lean particles descending in a state of hindered settling to form a sludge-lean phase in the lower portion of the particle separation zone. The concentration of sludge in the sludge-rich phase may be increased by decreasing the upward superficial liquid velocity, and conversely by increasing it. The sludge-lean particles are returned to the adsorption zone, by gravity flow or by forced recirculation, to contact additional sludge-containing liquid and eventually to accumulate sufficient adsorbed sludge as to rise to the sludge-rich phase. The sludge-rich phase is then passed to a clarification zone wherefrom separated clarified liquid and a slurry of sludge-rich particles are withdrawn. The clarification zone may comprise a continuous sedimentation zone, mechanical separation means such as a rotary vacuum filter or centrifugal filter, or a series combination of a continuous sedimentation zone followed by mechanical separation of the sludge-rich particle underflow into additional clarified liquid and free-flowing, sludge-rich particles. In a preferred embodiment of the process, the sludge-rich particles are then sent to a regeneration zone for removal of contaminants thereon and regeneration of their adsorptive character, and are thence returned to the adsorption zone for reuse.

Suitable adsorbents utilized in the present process include, but are not limited to, clays and earths such as fuller's earth, bauxite, bentonite, montmorillonite, either raw or acid-treated, synthetic adsorbents such as silica gel, activated alumina, silica-alumina composites, activated carbons, chars, and similar well-known adsorbents. In a broad sense, the preferred adsorbents employed in the present invention comprise siliceous or aluminiferous constituents, or both, either naturally occurring or synthetically produced. These adsorbent materials not only have excellent sludge-adsorbing characteristics but also are able to adsorb various metallic salts, for example $AlCl_3$, which are dissolved or entrained in the liquid hydrocarbon. The particular adsorbent employed will be selected such that it is insoluble in and inert toward both the liquid carrier and the catalyst used in the preceding reaction zone; for example in an HF-catalyzed alkylation process, a silica-containing adsorbent would obviously be unsuitable and, in this instance, alumina or an activated charcoal adsorbent is preferred. Some adsorbents will be found to have a greater difference in settling rates as between the sludge-rich and sludge-lean particles, and these are generally preferred in order to effect a more efficient separation without unduly increasing the physical size of the contacting apparatus. In most cases, the sludged adsorbent may be regenerated by water washing to leach out water soluble components and thereafter calcining at an elevated temperature to burn off carbonaceous material therefrom.

A comparison of the settling rates of sludged and unsludged adsorbents was made for various commercial adsorbents to ascertain the relative ease of separation thereof by the aforesaid fluidized bed technique. The settling rates were determined by a standard batch sedimentation test wherein the particles were first uniformly dispersed in a column of liquid hexane and then allowed to settle out, the settling rate being the rate of descent of the interface between the upper layer of supernatant hexane and the lower layer of slurry. The unsludged adsorbent was free of sludge and the sludged adsorbent contained approximately 4% to 10% sludge by weight of adsorbent, the sludge having been prepared from the $AlCl_3$-catalyzed condensation of mixed amylenes. For each adsorbent the sludged and unsludged particle settling rates were separately measured under like conditions. Exemplary adsorbents which were tested are as follows:

*Table I*

| Adsorbent | Description |
| --- | --- |
| A | "Celite," a diatomaceous earth having a particle size in the range of 1-60 microns. |
| B | Alumina; screen analysis: 100% through 200 mesh, 50% through 300 mesh. |
| C | Silica-alumina, 88% $SiO_2$ and 12% $Al_2O_3$, microspherical; screen analysis: 97% through 100 mesh, 70% through 200 mesh, 51% through 270 mesh. |
| D | "Sil-Flo" fines, a fluffy volcanic ash having a particle size in the range of 1-30 microns. |

The ratio of the settling rate of sludged particles to fresh or unsludged particles for each of the above adsorbents is given in Table II below:

*Table II*

| Adsorbent | Settling time ratio, sludged particles/unsludged particles |
| --- | --- |
| A | 8.2-10.3 |
| B | 5.1 |
| C | 2.1 |
| D | 17.7-20.3 |

Settling velocities varied from 2.2 ft./min. for unsludged "Celite" to 0.031 ft./min. for sludged "Silo-Flo." The materials tested held up to 10% sludge without agglomeration of particles or transfer of sludge to vessel walls. When sucked free of hydrocarbon by vacuum means, the sludged adsorbents behaved as dry, free-pouring solids. The multiple-fold difference in settling rates as between sludged and unsludged particles is all the more surprising in view of the fact that there was no correlation between the bulk density of the sludged particles and their settling rate; hence this behavior is not capable of prediction by known physical laws.

The operation of the process of this invention may best be described with reference to a schematic flow diagram. FIGURE 1 of the drawings, is presented as exemplary of the general features of the process, as well as a preferred embodiment thereof, but is not intended to be limiting upon the broad scope of the invention. FIGURE 2 of the drawings shows graphically a sludge concentration profile for an adsorber column.

Alternative flow schemes and various insignificant modifications thereto will be apparent from the following description. As embraced in FIGURE 1, the sludge-adsorbing facilities are employed in conjunction with an isoparaffin-olefin alkylation process wherein an $AlCl_3$-containing sludge is itself used as the catalyst. Only so much of the process flow as concerns the present invention is herein illustrated; additional features and equipment essential to a complete alkylation unit, such as a product fractionator train, various recycle streams, etc. have been omitted from the flow diagram for the sake of clarity. Those skilled in the alkylation art will, of course, be able to furnish these elements in accordance with accepted design practice.

Hydrocarbon charge is introduced via line 1 to reactor 2, which may be of the stirred contactor type and will usually include cooling means to remove the exothermic heat of reaction. The charge comprises an excess of isoparaffin, for example, isobutane, and lesser amounts of olefins such as propylene or butylene, and usually one or more recycle streams not shown here. Within the reactor, the reactants are thoroughly mixed with sludge which is enriched with a substantial quantity of aluminum chloride and the resulting effluent is discharged from reactor 2 to a sludge settling drum 4 through line 3; the major portion of the sludge is disengaged therein by quiescent settling and recycled to reactor 2 via pump 6 and line 7. Since sludge is continually being formed in the reactor, excess sludge is continuously or intermittently withdrawn from the reactor system via line 8 in order to maintain the overall sludge inventory within predetermined limits. The partially clarified hydrocarbon effluent, comprising alkylate and excess isoparaffin, leaves sludge settler 4 through line 9; this effluent stream still contains substantial amounts of dissolved and entrained sludge and aluminum chloride and, were it not for the sludge removal method of this invention, such contaminants would eventually foul and corrode downstream equipment. The effluent is charged via line 9 and inlet distributor 11 into the lowermost portion of a vertically elongated adsorber column 10, which actually comprises three serially connected, functionally separate zones: lower zone I is a co-current adsorption zone, intermediate zone II is a particle separation zone, and upper zone III is a clarification zone. A slurry of a solid granular adsorbent is charged via line 12 to the bottom of zone I wherein it is mixed with incoming sludge-containing liquid from distributor pipe 11, and the resulting suspension is caused to flow upwardly therethrough. The superficial liquid velocity within zone I is sufficiently high so that all particles, sludge-lean as well as sludge-rich, are carried upwardly in a fluidized state. Virtually all of the sludge and aluminum chloride is removed from the liquid hydrocarbon and deposited on the adsorbent in zone I, and the suspension leaving zone I and entering zone II therefore consists essentially of liquid, sludge-rich particles and sludge-lean particles. The superficial liquid velocity within particle separation zone II is reduced below the settling rate of sludge-lean particles but is still kept greater than the settling rate of sludge-rich particles; the reduction of liquid velocity may be accomplished by enlarging the cross-sectional area of the vessel, or withdrawing a slip stream of sludge-lean particles as effected by line 13, pump 14 and line 15, or both, as desired. The fluidized particle bed within zone II is thus separated into an upper sludge-rich phase and a lower sludge-lean phase. Sludge-lean particles within the lower portion of zone II gradually lose their upward velocity and then descent countercurrently to the upward flow of liquid in a state of hindered settling, thereby removing the last traces of sludge from the liquid and eventually acquiring enough adsorbed sludge as to be carried to the upper sludge-rich phase. In a preferred embodiment of the process, a slurry of sludge-lean particles is withdrawn through line 13 and recycled via pump 14 and lines 15 and 12 back to adsorption zone I. The total adsorbent charged to the adsorption zone through line 12 thus comprises sludge-lean adsorbent recycle and regenerated adsorbent from line 25, as hereinafter explained. The external recycle of sludge-lean particles provides a more efficient utilization thereof as well as a means of velocity control in zone I by superimposing a freely variable recycle flow on the net flow of reactor effluent, the latter being normally fixed by outside considerations. The sludge-rich phase, substantially free of sludge-lean particles, flows from the upper portion of particle separation zone II to clarification zone III which operates as a continuous sedimentation zone. In zone III the superficial liquid velocity is further reduced to a value below the settling rate of the sludge-rich particles thereby accumulating a preponderance of sludge-rich particles in the lower portion thereof. The velocity reduction may be effected by enlarging the cross-section of the column, as illustrated. Clarified effluent, substantially free of particles and dissolved matter, is taken overhead through line 19. A slurry of sludge-rich particles is withdrawn from the lower portion of clarification zone III through line 16 and sent to a centrifugal filter 17 wherefrom additional clarified effluent is separated and passed through line 18 to overhead line 19, the total clarified effluent being sent via line 20 to downstream processing facilities. An underflow of sludge-rich particles, substantially hydrocarbon free, is discharged from filter 17 and sent through line 21 to adsorbent regeneration unit 22. Line 21 may physically comprise a conveyor belt or bucket elevator, a gas lift, a fluid slurry transfer conduit or any other means well-known to those skilled in the art of transporting particulate solids. In most cases, the adsorbent regeneration unit, which may be operated continuously or intermittently, comprises means for washing the particles with water or an aqueous sludge-decomposing solution (for example, dilute aqueous acid). This washing step may be accomplished, for example, in a stirred mixing vessel or in a perforated plate contacting tower. The regeneration facilities should also include means for calcining the washed particles at a temperature of from about 500° F. to about 2000° F. to drive off adsorbed and combined water and to burn off carbonaceous deposits from the adsorbent particles. Regenerated adsorbent particles, preferably in the form of a slurry, are passed via lines 23, 25 and 12 to the adsorption zone of adsorber 10. In order to compensate for normal attritional losses of adsorbent fresh adsorbent may from time to time be charged to the system through line 24. It is contemplated that the necessary control of inventory, stabilization of the location of sludge-rich and sludge-lean phases within the adsorber, system pressure, etc. will be effected through conventional flow controllers, liquid level controllers, differential pressure controllers and the like according to process requirements and implemented in a manner familiar to those skilled in the chemical process arts. For example, the sludge-lean recycle may be flow-controlled with the flow being reset in response to the differential pressure across zone II, the sludge-rich withdrawal rate may be flow-controlled with the flow varied in response to the differential pressure across zone III, and the clarified effluent flow may be throttled in response to adsorber pressure.

The graph of FIGURE 2, previously referred to, illustrates a typical sludge concentration profile of a properly operating adsorber column. As shown, the sludge-rich takeoff point is at or near the point of maximum sludge concentration, thus assuring the maximum rate of sludge removal with minimum solids recirculation and regeneration thereof. The actual concentration of sludge on adsorbent depends upon the adsorbent:liquid ratio within the adsorption zone and also upon the degree of particle separation in zone II, the latter being dependent in turn upon the upward liquid velocity therethrough. In general, the operating conditions are regulated so that the maximum sludge concentration on adsorbent does not exceed 20% by weight of adsorbent, and preferably is maintained within the range of from about 4% to about 15% by weight. Adsorbent particles having more than 20% sludge deposited thereon are likely to lose their free-flowing characteristics and will often agglomerate into relatively large, sticky globules which adhere to the walls of vessels and conduits, are prone to clog pumps, exchangers, etc. and obviously become useless as adsorbing agents in the type of operation discussed herein.

Various modifications and refinements may be made to the above described process within the spirit and scope of the present invention. Zones I through III inclusive may be contained in two or even three separate vessels, either vertically or horizontally disposed. Adsorption zone I may comprise one or more stirred vessels or a single countercurrent multiple plate contacting column. Clarification zone III may be replaced with a single large centrifugal or rotary vacuum filter; in one embodiment of this invention, mechanical separation means, such as filter 17, may be omitted and the sludge-rich slurry may be charged directly to a flash tower from which vaporized hydrocarbon is taken overhead and dry, free-flowing, sludge-rich adsorbent particles are taken off as a bottoms stream. In another embodiment of the invention, where it should prove more economical to discard the spent adsorbent, the adsorbent regeneration facilities may be dispensed with. Regarding the construction of adsorbent column 10, various internal baffling means may be provided to provide better liquid-solid contact and internal flow control than the simplified column of FIGURE 1 could achieve. In particular, it may be desirable to provide annular particle collection baffles each directly beneath the sludge-rich phase and sludge-lean phase withdrawal nozzles respectively, and the particle-collecting ability of the baffles may be further augmented by providing them with mechanical scraper blades. The particle withdrawal nozzles may also be constructed as a plurality of co-planar, circumferentially spaced nozzles instead of the single nozzles illustrated in FIGURE 1. The sludge-lean particle recycle and regenerated adsorbent inlet lines may discharge into the adsorption zone at different elevations; for example, line 25 may enter zone I at a selected distance between lines 12 and 13.

As has been previously discussed, the sludge removal method of this invention is applicable to a variety of hydrocarbon conversion processes in addition to the AlCl$_3$-enriched sludge-catalyzed alkylation process of FIGURE 1. The instant invention is generally useful in any application calling for the continuous elimination of organic sludge from a flowing liquid and is particularly effective when operated in conjunction with conversion processes involving hydrocarbons which employ a sludge-forming catalyst such as a Friedel-Crafts metal halide, hydrofluoric acid and sulfuric acid; these processes include isomerization of paraffins, alkylation of isoparaffins and aromatics, acetylation of aromatics, polymerization of olefins, etc. Other areas of application include the clarification of waste water, concentration of salts, and the recovery of metals from sea water.

I claim as my invention:

1. A continuous process for the removal of sludge comprising a liquid complex of an acidic catalyst and high boiling hydrocarbon polymers from a hydrocarbon liquid containing the same which comprises mixing solid granular adsorbent with said liquid to form a suspension and adsorbing said sludge onto at least a portion of said adsorbent to form sludge-rich particles and sludge-lean particles, the sludge-rich particles having a settling rate slower than the settling rate of said sludge-lean particles, flowing said suspension upwardly through a particle separation zone at a superficial liquid velocity less than the settling rate of said sludge-lean particles but greater than the settling rate of said sludge-rich particles thereby accumulating a preponderance of sludge-lean particles in the lower portion of said particle separation zone and a preponderance of sludge-rich particles in the upper portion thereof, withdrawing the resultant sludge-rich suspension from said upper portion and thereafter separating clarified liquid from said sludge-rich suspension.

2. A continuous process for the removal of sludge comprising a liquid complex of an acidic catalyst and high boiling hydrocarbon polymers from a hydrocarbon liquid containing the same which comprises mixing solid granular adsorbent with said liquid to form a suspension and adsorbing said sludge onto at least a portion of said adsorbent to form sludge-rich particles and sludge-lean particles, the sludge-rich particles having a settling rate slower than the settling rate of said sludge-lean particles, flowing said suspension upwardly through a particle separation zone at a superficial liquid velocity less than the settling rate of said sludge-lean particles but greater than the settling rate of said sludge-rich particles thereby accumulating a preponderance of sludge-lean particles in the lower portion of said particle separation zone and a preponderance of sludge-rich particles in the upper portion thereof, passing the resultant sludge-rich suspension from said upper portion into a clarification zone and flowing said suspension upwardly therethrough at a superficial liquid velocity less than the settling rate of said sludge rich particles, withdrawing a slurry of sludge-rich particles from the lower portion of said clarification zone and withdrawing clarified liquid from the upper portion thereof.

3. A continuous process for the removal of sludge comprising a liquid complex of an acidic catalyst and high boiling hydrocarbon polymers from a hydrocarbon liquid containing the same which comprises mixing solid granular adsorbent with said liquid in an adsorption zone to form a suspension and therein adsorbing said sludge onto at least a portion of said adsorbent to form sludge-rich particles and sludge-lean particles, the sludge-rich particles having a settling rate slower than the settling rate of said sludge-lean particles, flowing said suspension upwardly through a particle separation zone at a superficial liquid velocity less than the settling rate of said sludge-lean particles but greater than the settling rate of said sludge-rich particles thereby accumulating a preponderance of sludge-lean particles in the lower portion of said particle separation zone and a preponderance of sludge-rich particles in the upper portion thereof, withdrawing a slurry of sludge-lean particles from said lower portion and recirculating said slurry to said adsorption zone, withdrawing the resultant sludge-rich suspension from said upper portion and separating clarified liquid from said sludge-rich suspension.

4. A continuous process for the removal of sludge comprising a liquid complex of an acidic catalyst and high boiling hydrocarbon polymers from a hydrocarbon liquid containing the same which comprises introducing said liquid together with solid adsorbent particles into the lower portion of a co-current adsorption zone thereby forming a suspension therein, flowing said suspension upwardly through said adsorption zone at a superficial liquid velocity in excess of the settling rate of said particles whereby to impart a net upward velocity to said particles, therein adsorbing said sludge onto at least a portion of said particles to form sludge-rich particles and sludge-lean particles, the sludge-rich particles having a settling rate slower than the settling rate of said sludge-lean particles, thereafter passing said suspension into and upwardly through a particles separation zone at a superficial liquid velocity less than the settling rate of said sludge-lean particles but greater than the settling rate of said sludge-rich particles thereby creating in said particle separation zone an upper sludge-rich phase and a lower sludge-lean phase, withdrawing a slurry of sludge-lean particles from said sludge-lean phase and returning said slurry to said adsorption zone, flowing said sludge-rich phase into and upwardly through a clarification zone at a superficial liquid velocity less than the settling rate of said sludge-rich particles, withdrawing a slurry of sludge-rich particles from the lower portion of said clarification zone and withdrawing clarified liquid from the upper portion thereof.

5. A continuous process for the removal of sludge comprising a liquid complex of an acidic catalyst and high boiling hydrocarbon polymers from a hydrocarbon liquid containing the same which comprises introducing said liquid together with solid adsorbent particles into the lower portion of a co-current adsorption zone thereby forming a suspension therein, flowing said suspension upwardly through said adsorption zone at a superficial liquid velocity in excess of the settling rate of said particles whereby to impart a net upward velocity to said particles, therein adsorbing said sludge onto at least a portion of said particles to form sludge-rich particles and sludge-lean particles, the sludge-rich particles having a settling rate slower than the settling rate of said sludge-lean particles, thereafter passing said suspension into and upwardly through a particle separation zone at a superficial liquid velocity less than the settling rate of said sludge-lean particles but greater than the settling rate of sludge-rich particles thereby creating in said particle separation zone an upper sludge-rich phase and a lower sludge-lean phase, withdrawing a slurry of sludge-lean particles from said sludge-lean phase and returning said slurry to said adsorption zone, flowing said sludge-rich phase into and upwardly through a clarification zone at a superficial liquid velocity less than the settling rate of said sludge-rich particles, withdrawing a slurry of sludge-rich particles from the lower portion of said clarification zone, withdrawing clarified liquid from the upper portion thereof, passing said withdrawn slurry of sludge-rich particles to a second particle separation zone and therein recovering substantially liquid-free sludge-rich particles, passing the last-mentioned particles to a regeneration zone and therein removing the major portion of sludge therefrom, and returning the resulting regenerated adsorbent particles to said adsorption zone.

6. The process of claim 5 further characterized in that said particles in said regeneration zone are subjected to water washing to remove water soluble components therefrom, and thereafter are subjected to calcination at an elevated temperature to burn off carbonaceous material therefrom.

7. A continuous process for the removal of sludge comprising a liquid complex of an acidic catalyst and high boiling hydrocarbon polymers from a liquid hydrocarbon containing the same which comprises mixing solid granular adsorbent with said hydrocarbon to form a suspension and adsorbing said sludge onto at least a portion of said adsorbent to form sludge-rich particles and sludge-lean particles, the sludge-rich particles having a settling rate slower than the settling rate of said sludge-lean particles, flowing said suspension upwardly through a particle separation zone at a superficial liquid velocity less than the settling rate of said sludge-lean particles but greater than the settling rate of said sludge-rich particles thereby creating in said particles separation zone an upper sludge-rich phase and a lower sludge-lean phase, withdrawing the resulting sludge-rich suspension from said sludge-rich phase and thereafter separating clarified hydrocarbon from said sludge-rich suspension.

8. A continuous process for the removal of sludge comprising a liquid complex of an acidic catalyst and high boiling hydrocarbon polymers from a liquid hydrocarbon containing the same which comprises introducing said hydrocarbon together with solid adsorbent particles into the lower portion of a co-current adsorption zone thereby forming a suspension therein, flowing said suspension upwardly through said adsorption zone at a superficial liquid velocity in excess of the settling rate of said particles whereby to impart a net upward velocity to said particles, therein adsorbing said sludge onto at least a portion of said particles to form sludge-rich particles and sludge-lean particles, the sludge-rich particles having a settling rate slower than the settling rate of said sludge-lean particles, thereafter passing said suspension upwardly through a particle separation zone in open communication with said adsorption zone at a superficial liquid velocity less than the settling rate of said sludge-lean particles but greater than the settling rate of said sludge-rich particles thereby creating in said particle separation zone an upper sludge-rich phase and a lower sludge-lean phase, withdrawing a slurry of sludge-lean particles from said sludge-lean phase and returning said slurry to the lower portion of said adsorption zone, flowing said sludge-rich phase upwardly through a clarification zone in open communication with said particle separation zone at a superficial liquid velocity less than the settling rate of said sludge-rich particles, withdrawing a slurry of sludge-rich particles from the lower portion of said clarification zone and withdrawing clarified hydrocarbon from the upper portion thereof.

9. In the method of removing sludge from a sludge-containing liquid hydrocarbon by contacting said hydrocarbon with a solid adsorbent, said hydrocarbon comprising conversion products previously formed in the presence of an acid catalyst at conversion conditions and said sludge comprising a liquid complex of acidic catalyst and high boiling hydrocarbon polymers, the improvement which comprises, mixing solid granular adsorbent with said hydrocarbon in an adsorption zone to form a suspension and therein adsorbing said sludge onto at least a portion of said adsorbent to form sludge-rich particles and sludge-lean particles, the sludge-rich particles having a settling rate slower than the settling rate of said sludge-lean particles, flowing said suspension upwardly through a particle separation zone at a superficial liquid velocity less than the settling rate of said sludge-lean particles but greater than the settling rate of said sludge-rich particles thereby accumulating a preponderance of sludge-lean particles in the lower portion of said particle separation zone and a preponderance of sludge-rich particles in the upper portion thereof, withdrawing a slurry of sludge-lean particles from said lower portion and recirculating said slurry to said adsorption zone, withdrawing the resultant sludge-rich suspension from said upper portion and thereafter separating clarified hydrocarbon from said sludge-rich suspension.

10. The process of claim 1 further characterized in that the acidic catalyst component of said sludge complex is aluminum chloride.

References Cited in the file of this patent

UNITED STATES PATENTS

| | | |
|---|---|---|
| 1,943,583 | Connolly et al. | Jan. 16, 1934 |
| 2,527,964 | Robinson | Oct. 31, 1950 |
| 2,553,407 | Epps et al. | May 15, 1951 |
| 2,945,910 | Peterson | July 19, 1960 |